(12) United States Patent
Zhou et al.

(10) Patent No.: US 11,603,443 B2
(45) Date of Patent: Mar. 14, 2023

(54) COMPOSITE POROUS MEMBRANE AND PREPARATION METHOD THEREFOR AND USE THEREOF

(71) Applicant: BEIJING NORMAL UNIVERSITY, Beijing (CN)

(72) Inventors: Jianjun Zhou, Beijing (CN); Lin Li, Beijing (CN); Zhiyu Hu, Beijing (CN)

(73) Assignee: BEIJING NORMAL UNIVERSITY, Beijing (CN)

( * ) Notice: Subject to any disclaimer, the term of this patent is extended or adjusted under 35 U.S.C. 154(b) by 469 days.

(21) Appl. No.: 16/640,391

(22) PCT Filed: Aug. 24, 2018

(86) PCT No.: PCT/CN2018/102316
§ 371 (c)(1),
(2) Date: Feb. 20, 2020

(87) PCT Pub. No.: WO2019/037785
PCT Pub. Date: Feb. 28, 2019

(65) Prior Publication Data
US 2020/0360866 A1  Nov. 19, 2020

(30) Foreign Application Priority Data

Aug. 25, 2017 (CN) .......................... 201710744074.X
Apr. 4, 2018 (CN) .......................... 201810302163.3

(51) Int. Cl.
*B01D 53/22* (2006.01)
*C08J 7/043* (2020.01)
(Continued)

(52) U.S. Cl.
CPC ............ *C08J 7/043* (2020.01); *B01D 53/228* (2013.01); *B01D 69/125* (2013.01); *B01D 71/26* (2013.01);
(Continued)

(58) Field of Classification Search
CPC ............ B01D 69/125; B01D 2325/021; B01D 67/0027; B01D 2325/04; B01D 53/228;
(Continued)

(56) References Cited

U.S. PATENT DOCUMENTS 4,257,997 A * 3/1981 Soehngen ............. H01M 50/40
264/289.3
5,233,924 A * 8/1993 Ohba ...................... B32B 27/18
428/315.7

(Continued)

FOREIGN PATENT DOCUMENTS

| CN | 1062357 A | 7/1992 |
|----|-----------|--------|
| CN | 101245150 A | 8/2008 |

(Continued)

OTHER PUBLICATIONS

József Varga, "β-Modification of Isotactic Polypropylene: Preparation, Structure, Processing, Properties, and Application", Journal of Macromolecular Science: Physics 2002, vol. 41, Issue 4-6, pp. 1121-1171.

*Primary Examiner* — Anthony R Shumate
(74) *Attorney, Agent, or Firm* — Novick, Kim & Lee, PLLC; Allen Xue (57) ABSTRACT

A composite porous membrane contains at least one porous base layer and at least one uniaxially stretched coating layer located on at least one side surface of the porous base layer. For example, the composite porous membrane comprises at least one porous base layer and at least one nanofiber-like non-polyolefin polymer porous layer oriented along the transverse stretching direction of the composite porous membrane and located on one or two side surfaces of the porous base layer, or the composite porous membrane comprises a biaxially stretched polypropylene porous base layer and a uniaxially stretched coating layer located on at least one side surface of the porous base layer. The com- (Continued)

posite porous membrane is coated with a coating solution prior to transversely stretching. The nanofiber-like non-polyolefin polymer porous layer may reduce cracking of the composite porous membrane in the machine direction.

12 Claims, 2 Drawing Sheets

(51) Int. Cl.
| | |
|---|---|
| *B01D 69/12* | (2006.01) |
| *B01D 71/26* | (2006.01) |
| *B01D 71/34* | (2006.01) |
| *B01D 71/48* | (2006.01) |
| *H01M 50/491* | (2021.01) |
| *H01M 50/443* | (2021.01) |
| *H01M 50/489* | (2021.01) |
| *B01D 67/00* | (2006.01) |
| *H01M 50/474* | (2021.01) |

(52) U.S. Cl.
CPC ............. *B01D 71/34* (2013.01); *B01D 71/48* (2013.01); *H01M 50/443* (2021.01); *H01M 50/489* (2021.01); *H01M 50/491* (2021.01); *B01D 67/0027* (2013.01); *B01D 2323/21* (2013.01); *B01D 2323/50* (2013.01); *B01D 2325/021* (2013.01); *B01D 2325/04* (2013.01); *H01M 50/474* (2021.01)

(58) Field of Classification Search
CPC ............ B01D 2323/50; B01D 2323/21; B01D 71/34; B01D 71/48; B01D 71/26; C08J 7/043; H01M 50/40
See application file for complete search history.

(56) References Cited

U.S. PATENT DOCUMENTS

| | | | | |
|---|---|---|---|---|
| 5,409,588 | A * | 4/1995 | Mushiake | H01M 50/491 204/252 |
| 5,478,644 | A * | 12/1995 | Takahashi | C08J 7/044 428/483 |
| 6,010,776 | A * | 1/2000 | Exsted | B01D 67/003 521/61 |
| 6,153,133 | A * | 11/2000 | Kaimai | B29C 67/202 264/210.4 |
| 6,896,941 | B1 * | 5/2005 | Yoshida | B41M 5/0064 428/32.2 |
| 2008/0206556 | A1 * | 8/2008 | Kuwahara | C08J 7/048 428/335 |
| 2009/0098341 | A1 * | 4/2009 | Takita | B01D 69/02 428/159 |
| 2009/0146334 | A1 * | 6/2009 | Takita | H01M 50/406 264/41 |
| 2010/0093878 | A1 * | 4/2010 | Yang | H01M 8/1072 521/27 |
| 2014/0045033 | A1 * | 2/2014 | Zhang | H01M 50/434 429/145 |
| 2014/0217013 | A1 * | 8/2014 | Sato | H01M 50/494 428/398 |
| 2015/0162588 | A1 | 6/2015 | Lee et al. | |
| 2016/0118639 | A1 * | 4/2016 | Ishihara | H01M 50/489 264/171.23 |
| 2016/0359157 | A1 * | 12/2016 | Zhang | H01M 50/403 |
| 2017/0084898 | A1 * | 3/2017 | Stokes | H01M 50/403 |
| 2018/0083247 | A1 * | 3/2018 | Seo | B32B 27/302 |
| 2018/0361326 | A1 * | 12/2018 | Kuwana | B01D 71/40 |
| 2020/0277465 | A1 * | 9/2020 | Kondo | H01M 50/494 |

FOREIGN PATENT DOCUMENTS

| | | |
|---|---|---|
| CN | 103724646 A | 4/2014 |
| CN | 203779820 U | 8/2014 |
| CN | 105826508 A | 8/2016 |

* cited by examiner

COMPOSITE POROUS MEMBRANE AND PREPARATION METHOD THEREFOR AND USE THEREOF

CROSS-REFERENCE TO RELATED APPLICATIONS

This application is an U.S. national stage application of International Application No. PCT/CN2018/102316, filed Aug. 24, 2018, which claims the benefit of priority from CN 201710744074.X, entitled "Composite porous membrane and preparation method therefor and use thereof," filed Aug. 25, 2017, and CN 201810302163.3, entitled "Composite porous membrane with a nanofiber-like porous layer oriented along the transverse stretching direction," filed Apr. 4, 2018; the entire content of which is incorporated herein by reference in its entirety.

TECHNICAL FIELD

The invention belongs to the technical field of porous membranes, and particularly relates to a composite porous membrane, a preparation method therefor and a use thereof.

BACKGROUND ART

Porous polyolefin membranes are a kind of polymeric membranes, and the porous membranes have a pore size of 5 nm-1000 nm, which are widely used in the fields of gas-permeable materials (such as diapers, medical dressings, clothes linings, etc.), materials for liquid separation, materials for ultrafiltration, materials for membrane filtration, and materials for supercapacitor and battery separators, etc.

There are two main methods for preparing the existing porous polyolefin membranes, one of which is melt-extrusion stretching method (dry method), and the other one is thermal-induced phase separation method (TIPS, wet method). Wherein, the dry stretching process can also be divided into a uniaxial stretching process and a biaxial stretching process. The wet preparation process is to add high-boiling point small molecular substances as porogens to polyolefins, and dissolve them in organic solvents to form cast films. After phase separation occurring upon cooling, small molecules are extracted with organic solvents, and the cast film is biaxially stretched to form porous structures. The dry biaxial stretching process has been widely used due to no need for solvents and relatively high strength in both machine and transverse stretching directions.

The dry biaxial stretching process mainly involves adding β-crystal modifiers with nucleation effect to polypropylene, forming polypropylene films with high content of β-crystal, which transform into the α-crystal during the stretching process. The porous structures form due to the density differences among various phases of polypropylene, which is used to produce single-layer polypropylene porous membranes. In the prior research (CN1062357A), it disclosed a porous membrane obtained by stretching a uniform original polypropylene film with high content of β-crystal. The porous membrane was produced by a melt-processing method, wherein nucleating agents were added to polypropylene resins for the film formation to obtain the film of polypropylene with β-crystal, which was then stretched 4-5 times in the machine direction and 2-4 times in the transverse direction to obtain the porous membrane. Since the stretching ratio in the machine direction was high, the membrane easily split in the machine direction during the cutting process when it was used as battery separators, leading to reduced qualified rates and production efficiency. Meanwhile, when the porous membrane, prepared by this method, was used as lithium ion battery separators, the infiltration of carbonate-based polar electrolytes into the non-polar polypropylene separators was poor in the batteries, because polypropylene is a non-polar material with low surface energy. At the same time, the difference in polarity between the non-polar polypropylene separators and the battery electrodes easily caused poor contact in the process of battery assembly. Therefore, it is of great significance to improve the using performance of the separators by mitigating the crack of the separators along the machine direction in the course of use and increasing the surface polarity of the separator.

SUMMARY

To overcome the deficiencies of the prior art, one of the objects of the present invention is to provide a composite porous membrane, a preparation method therefor and a use thereof. The composite porous membrane comprises at least one porous base layer and at least one uniaxially stretched coating layer located on at least one side surface of the porous base layer; in particular, the composite porous membrane comprises at least one porous base layer and at least one nanofiber-like non-polyolefin polymer porous layer oriented along the transverse stretching direction of the composite porous membrane and located on one or two side surfaces of the porous base layer, or, the composite porous membrane comprises a biaxially stretched porous base layer and a uniaxially stretched coating layer located on at least one side surface of the porous base layer. According to the preparation method, the composite porous membrane is prepared by introducing a coating solution prior to transversely stretching, and the nanofiber-like non-polyolefin polymer porous layer, oriented along the transverse stretching direction of the composite porous membrane, may inhibit cracking along the machine direction during using the composite porous membrane, and improve the using performance of the composite porous membrane.

A second object of the present invention is to provide a lithium ion battery separator, which comprises the above composite porous membrane. The lithium ion battery separator, with the composite porous membrane, can form a gel in electrolytes, which improves the wettability of the separator towards the electrolytes, the cycling and using performance of the batteries; and it also extends the service life of the lithium ion battery separator.

A third object of the present invention is to provide a gas separation membrane, which comprises the above composite porous membrane. The coating layer, in the gas separation membrane with the composite porous membrane, has different permeability coefficients for different gases, which can achieve gas separation and enrichment.

A fourth object of the present invention is to provide a facility for preparing composite porous membranes.

The object of the present invention is specifically realized by the following technical solutions:

A first aspect of the present invention provides a composite porous membrane, which comprises at least one porous base layer and at least one uniaxially stretched coating layer located on at least one side surface of the porous base layer.

In one embodiment of the present invention, the composite porous membrane comprises a biaxially stretched porous base layer and a uniaxially stretched coating layer located on at least one side surface of the porous base layer.

According to the present invention, the composite porous membrane further comprises a biaxially stretched coating layer located on at least one side surface of the porous base layer.

According to the present invention, the composite porous membrane further comprises a biaxially stretched coating layer located on at least one side surface between the porous base layer and the uniaxially stretched coating layer.

According to the present invention, the uniaxially stretched coating layer, located on at least one side surface of the porous base layer, can be a porous coating layer or a non-porous dense coating layer.

According to the present invention, the biaxially stretched coating layer, located on at least one side surface of the porous base layer, can be a porous coating layer or a non-porous dense coating layer.

According to the present invention, the thickness of the coating layer is 0.1-4 μm, preferably 1-2 μm.

Preferably, when the coating solution using an organic solvent as a medium, the coating layer formed after the coating solution is dried becomes a non-porous dense coating layer during stretching. The non-porous dense structure is consist of the polymer in the coating solution.

Preferably, when the coating solution of the coating layer is a composite coating solution composed of a solution with an organic solvent as a medium and inorganic fillers, the coating layer formed after the coating solution is dried becomes a porous coating layer during stretching. The porous structure is caused by the tensile fracture at the interface between the polymer dissolved in the coating solution and the inorganic fillers.

Preferably, when the coating solution of the coating layer is a dispersion using water as a medium, i.e., a polymer emulsion or an aqueous dispersion, the coating layer formed after the coating solution is dried becomes a porous coating layer during stretching. The porous structure is caused by the voids formed due to the accumulation of the polymer particles.

Preferably, when the coating solution of the coating layer is a composite coating solution composed of a dispersion using water as a medium, i.e., a polymer emulsion or an aqueous dispersion and inorganic fillers, the coating layer formed after the coating solution is dried becomes a porous coating layer during stretching. The porous structure is caused by the voids formed due to the accumulation of the polymer particles and by the tensile fracture at the interface between the polymer and the inorganic fillers.

Preferably, when the coating solution of the coating layer is a water-soluble polymer solution using water as a medium, the coating layer formed after the coating solution is dried becomes a non-porous dense coating layer during stretching. The non-porous dense structure is formed by the polymer dissolved in the coating solution.

Preferably, when the coating solution of the coating layer is a composite coating solution composed of a water-soluble polymer solution using water as a medium and inorganic fillers, the coating layer formed after the coating solution is dried becomes a porous coating layer during stretching. The porous structure is caused by the tensile fracture at the interface between the polymer and the inorganic fillers in the coating solution.

In another embodiment of the present invention, the composite porous membrane comprises at least one porous base layer and at least one nanofiber-like non-polyolefin polymer porous layer oriented along the transverse stretching direction of the composite porous membrane and located on one or two side surfaces of the porous base layer.

According to the present invention, the composite porous membrane comprises at least one porous base layer and at least one nanofiber-like non-polyolefin polymer porous layer oriented along the transverse stretching direction of the composite porous membrane; the arrangement of the porous base layer and the nanofiber-like non-polyolefin polymer porous layer oriented along the transverse stretching direction of the composite porous membrane, known to those skilled in the art, is not specifically limited, which can be any arrangement between the layers known to those skilled in the art. The composite porous membrane exhibits good resistance to cracking along the machine direction, as well as good ion transport performance and significantly improved using performance.

According to the present invention, the composite porous membrane comprises a porous base layer and a nanofiber-like non-polyolefin polymer porous layer oriented along the transverse stretching direction of the composite porous membrane; the nanofiber-like non-polyolefin polymer porous layer oriented along the transverse stretching direction of the composite porous membrane is located on one side surface of the porous base layer.

According to the present invention, the composite porous membrane comprises a porous base layer and two nanofiber-like non-polyolefin polymer porous layers oriented along the transverse stretching direction of the composite porous membrane; the nanofiber-like non-polyolefin polymer porous layers oriented along the transverse stretching direction of the composite porous membrane are located on both sides of the porous base layer.

According to the present invention, the thickness of the nanofiber-like non-polyolefin polymer porous layer oriented along the transverse stretching direction of the composite porous membrane is not particularly limited, which can be any thickness known to those skilled in the art and prepared by the transverse stretching method; preferably, the thickness of the nanofiber-like non-polyolefin polymer porous layer oriented along the transverse stretching direction of the composite porous membrane is 0.1-4 μm, preferably 1-2 μm.

According to the present invention, the non-polyolefin polymer is preferably non-polyethylene based polymer and non-polypropylene based polymer; preferably, the non-polyolefin polymer belongs to non-polypropylene based polymer.

According to the invention, the diameters of the nanofibers are 10-500 nm, preferably 15-250 nm.

In each of the above embodiments, the selection of the porous base layer is not particularly limited, which can be any base layer for preparing a composite porous membrane known to those skilled in the art, and can meet the purpose of being used. For example, as a battery separator, the porous base layer can separator positive and negative electrodes and provide ion transport channels. Preferably, the porous base layer is selected from porous polyolefin base layers. As the porous polyolefin base layer, it is particularly advantageous to use a porous polyethylene base layer, a porous polypropylene base layer or a porous polypropylene/polyethylene/polypropylene tri-layer composite base layer. More preferably, the porous base layer is selected from porous polypropylene based layers.

In each of the above embodiments, the porosity, the gas permeability and the thickness of the porous base layer are not particularly limited, which can be any porosity, gas permeability and thickness known in the art, and the selection of the porosity, gas permeability and thickness of the porous base layer needs to fulfill the requirements for preparing the composite porous membrane of the present invention which exhibits high ion transport performance, thus achieving the goal of being used as an electronic component separator, i.e., taking the role of separating positive and negative electrodes and providing ion transport channels; preferably, the porosity of the porous base layer is 25-60%; the Gurley permeability of the porous base layer is 100-400 s; and the thickness of the porous base layer is 5-55 μm.

In each of the above embodiments, the tensile strength of the composite porous membrane in the machine direction is 60-130 MPa; the elongation at break in the machine direction is 5-70%; the tensile strength in the transverse direction is 15-60 MPa; the elongation at break in the transverse direction is 10-100%; the thickness of the composite porous membrane is 10-60 and more preferably 15-30 μm; and the Gurley permeability of the composite porous membrane is 100-400 s.

A second aspect of the present invention is to provide a method for producing the above composite porous membrane, which comprises the following steps of:

(S1) adding nucleating agent into polypropylene to promote the formation of β-crystal;

(S2) melting and extruding polypropylene mixed with the nucleating agent in step (S1), moulding to obtain a film with high content of β-crystal;

(S3) stretching the film with high content of β-crystal in the machine direction to obtain an axial stretching film, and coating a coating solution on one or two side surfaces of the axial stretching film;

(S4) transversely stretching the axial stretching film coated with a coating solution to obtain the composite porous membrane.

According to the second aspect of the present invention, the following steps can also be comprised between step (S2) and step (S3) of the method for producing the composite porous membrane:

(S2') coating a coating solution on one or two side surfaces of the film with high content of β-crystal obtained in step (S2), to obtain a film with high content of β-crystal coated with a coating solution.

According to the second aspect of the present invention, the composite porous membrane means that a film with high content of β-crystal is stretched in the machine direction to obtain an axial stretching film, one or two side surfaces of which are coated with a coating solution, and then transversely stretched to obtain the composite porous membrane; or, the composite porous membrane means that one or two side surfaces of a film with high content of β-crystal are coated with a coating solution, and then stretched in the machine direction to obtain an axial stretching film; the axial stretching film, one or two side surfaces of which are coated with a coating solution, is then transversely stretched to obtain the composite porous membrane.

According to the second aspect of the present invention, in step (S3) and step (S2'), the coating solution comprises a solution using an organic solvent as a medium, or a solution or a dispersion using water as a medium;

the solution using an organic solvent as a medium comprises a solution formed by dissolving polymer or polymer compositions with an organic solvent; the solution using water as a medium comprises a solution formed by dissolving water-soluble polymer or water-soluble polymer compositions with water; the dispersion using water as a medium comprise polymer or polymer composition emulsions obtained by the emulsion polymerization of water-insoluble polymer or water-insoluble polymer compositions, or aqueous dispersion containing polymer or polymer compositions obtained by grinding or pulverizing water-insoluble polymer or water-insoluble polymer compositions. Preferably, the solution using an organic solvent as a medium or the solution or dispersion using water as a medium may further comprises inorganic fillers.

Preferably, the inorganic fillers comprise one or more of silica, titanium dioxide, cerium oxide, zirconium dioxide, aluminum oxide, barium sulfate, calcium carbonate, carbon nitride, boehmite, silicon carbide, molecular sieves, talc, montmorillonite.

Preferably, in the solution using an organic solvent as a medium, the polymer or the polymer compositions comprise one or more of poly(vinylidene fluoride), poly(vinylidene fluoride-co-hexafluoropropylene) copolymer, polyacrylonitrile, poly(vinylidene chloride), polymethacrylate, polyethylene, polyethylene wax, chlorinated polyethylene, chlorinated polypropylene, poly(vinyl alcohol), polyurethane, poly(methyl methacrylate-co-acrylonitrile) copolymer, poly(oxyethylene ether), sodium alginate, cellulose derivatives, polydimethylsiloxane, polyimide, polyurethane, poly(sodium styrenesulfonate), sulfonated poly(ether ether ketone), poly(vinyl alcohol)-graft-poly(vinyl sulfonic acid) copolymer, sulfonated polysulfone, sulfonated polybenzimidazole, sulfonated poly(phenylquinoline), perfluorosulfonic acid polymer (e.g., Nafion), etc.

Preferably, in the solution using an organic solvent as a medium, the organic solvent may be selected from ketone solvents such as acetone, butanone, etc., may also be selected from alcohol solvents such as methanol, ethanol, etc., may also be selected from halogenated hydrocarbon solvents such as chloromethane, dichloromethane, chloroform, carbon tetrachloride, etc., may also be selected from amide solvents such as N,N-dimethylformamide, N,N-dimethylacetamide, etc., may also be selected from aromatic solvents such as benzene, toluene, xylene, etc., and tetrahydrofuran, N-methylpyrrolidone, dimethyl sulfoxide, or diethyl ether, etc.

Preferably, in the solution using water as a medium, the water-soluble polymer or the water-soluble polymer compositions comprise one or more of poly(vinyl alcohol), poly(oxyethylene ether), sodium alginate, sodium carboxymethyl cellulose, polyacrylamide, chitosan, konjac glucomannan, etc.

Preferably, in the dispersion using water as a medium, the water-insoluble polymer or the water-insoluble polymer compositions comprise one or more of poly(vinylidene fluoride), poly(vinylidene chloride), polytetrafluoroethylene, poly(vinylidene fluoride-co-hexafluoropropylene) copolymer, polystyrene, poly(methyl methacrylate), polyurethane, perfluorosulfonic acid polymer (e.g., Nafion), etc.

A third aspect of the present invention provides a method for producing the above composite porous membrane, comprising the following steps of:

Coating a coating solution on one or two side surfaces of the axial stretching film, and then transversely stretching to obtain the composite porous membrane.

According to the third aspect of the present invention, after the axial stretching film is coated, it is then transversely stretched, wherein the axial stretching film is treated with the transversely stretching, i.e., to obtain the composite porous membrane of the present invention; wherein the coating solution is treated with the transversely stretching, i.e., to obtain the nanofiber-like non-polyolefin polymer porous layer oriented along the transverse stretching direction of the composite porous membrane.

According to the third aspect of the present invention, the axial stretching film is prepared by conventional methods known to those skilled in the art. Preferably, the porosity of the axial stretching film is 5-35%. More preferably, the porosity of the axial stretching film is 15-35%. Preferably, the thickness of the axial stretching film is 16-80 μm; more preferably, the thickness of the axial stretching film is 20-60 μm.

According to the third aspect of the present invention, the composite porous membrane can be prepared by the following method of:

1) adding nucleating agent into polypropylene to promote the formation of β-crystal; melting and extruding the nucleating agent contained polypropylene, moulding to obtain a film with high content of β-crystal;

2) stretching the film with high content of β-crystal in the machine direction to obtain an axial stretching film, coating a coating solution on one or two side surfaces of the axial stretching film, and then transversely stretching to obtain the composite porous membrane.

According to the second and third aspects of the present invention, in step (S2) and step 1), the films with high content of β-crystal are polypropylene films with high β-crystal content; the tacticity and the melt index of the polypropylene are not particularly limited, the polypropylene films can be prepared by using nucleating agents to obtain the films with high content of β-crystal, which are further stretched in the machine direction to obtain axial stretching films having porosities of 5-35%; as an example, the polypropylene is polypropylene homopolymer or polypropylene copolymer. Preferably, the tacticity of the polypropylene is 90-98%; the melt index is 1-10 g/10 min. More preferably, the tacticity of the polypropylene is 95-98%; the melt index is 2-5 g/10 min.

According to the second and third aspects of the present invention, in step (S1) and step 1), the nucleating agents, which are capable of promoting the formation of β-crystalline form, are selected from those with high nucleation efficiency, and β-crystal content of 50% or more under static crystallization conditions. As an example, the nucleating agents are selected from the group consisting of commercially available products or products synthesized using prior art methods. The types and the nucleation efficiency of the nucleating agents can be found in Journal of Macromolecular Science: Physics 2002, 41, 1121 by Varga J. As an example, the nucleating agents can be either organic small molecules such as N,N-dicyclohexylterephthalamide, N,N-dicyclohexyl-2,6-naphthalenedicarboxamide, or γ-quinacridone, etc., or inorganic salts such as adipic acid dihydrazide and/or suberic acid dihydrazide, calcium salts of heptanedioic acid and/or suberic acid, calcium salts or barium salts of tetrahydrophthalic anhydride, calcium salts or barium salts of hexahydrophthalic anhydride, etc.; the nucleating agents can be mixed, which is understood by those skilled in the art that the mixing ratios of the nucleating agents are not particularly required, which are applicable to the system of the present invention. Those skilled in the art understand that the ratios of the nucleating agents capable of promoting the formation of β-crystalline form to polypropylene are also conventionally selected, for example, 0.001-0.1 wt %.

According to the second and third aspects of the present invention, in step (S2) and step 1), in the preparation of the films with high content of β-crystal of the present invention, the processes adopted such as melt extrusion and crystallization moulding etc. are conventional methods known in the art, i.e., after the polypropylene is melted, it crystallizes and moulding on casting rollers to obtain films with high content of β-crystal. It can be understood by those skilled in the art that the temperatures of the casting rollers are not particularly limited, at which the melt-extruded polypropylene can crystallize mould on the surface of the casting rollers. Preferably, the temperatures of the casting rollers are 110-140° C., and more preferably, the temperatures of the casting rollers are 120-130° C.

According to the second and third aspects of the invention, in step (S2) and step 1), the melt extrusion is preferably carried out in a screw extruder; those skilled in the art can understand that the screw extruder is not particularly limited, which can be a single-screw extruder or a twin-screw extruder, and is applicable to the system of the present invention. The moulding is preferably through a slit die; those skilled in the art can understand that the slit die is not particularly limited, which can be an adjustable slit die or an unadjustable slit die, and is applicable to the system of the present invention.

According to the second and third aspects of the invention, in step (S2) and step 1), the melt extrusion temperature of the melt extruders is not particularly limited, which can be used in the polypropylene system of the present invention known to those skilled in the art, and at the temperature the melt extrusion can be carried out to obtain films with high content of β-crystal. Preferably, the melt extrusion temperature of the screw extruder for extruding the films with high content of β-crystal is 200-260° C., and more preferably, the melt extrusion temperature of the screw extruder for extruding the films with high content of β-crystal is 220-250° C.

According to the second and third aspects of the present invention, in step (S2) and step 1), the thickness of the films with high content of β-crystal is not particularly limited, which is applicable to the composite porous membrane system of the present invention, and the function of the composite porous membranes can be realized, i.e., taking the role of separating positive and negative electrodes and providing lithium ion transport channels. The thickness of the films with high content of β-crystal can be reasonably selected based on the thickness, transverse stretching ratios and axial stretching ratios of the target product-composite porous membranes. Preferably, the thickness of the films with high content of β-crystal is 80-300 μm, and more preferably, the thickness of the films with high content of β-crystal is 100-200 μm.

According to the second and third aspects of the present invention, in step (S2) and step 1), the content of β-crystal in the films with high content of β-crystal are not particularly limited, but the films with high content of β-crystal can be prepared and obtained, which are stretched for preparing composite porous systems applicable to the present invention, and the stretching films with high content of β-crystal must also be capable of realizing the function of the composite porous membranes, that is, taking the role of separating positive and negative electrodes and providing lithium ion transport channels. Preferably, the content of β-crystal in the films with high content of β-crystal are higher than 80%, and more preferably, the content of β-crystal in the films with high content of β-crystal are higher than 85%.

According to the second and third aspects of the invention, in step (S3) and step 2), the axial stretching temperature is 60-120° C., preferably, the axial stretching temperature is 80-110° C.; the axial stretching ratio is 2.5-5.5 times, preferably, the axial stretching ratio is 3-5 times; after the coating solution is dried, the thicknesses of the obtained coating layers are 0.3-10 μm; preferably, after the coating solution is dried, the thicknesses of the obtained coating layers are 2-10 μm, more preferably 3-5 μm.

According to the second and third aspects of the present invention, in step (S4) and step 2), as those skilled in the art know, the transverse stretching temperatures and the transverse stretching ratios are not specifically limited, but can be applicable to the composite porous membrane systems of the present invention; those skilled in the art can select different transverse stretching ratios according to the application fields of the composite porous membranes, and furthermore, control the thicknesses of the coating layers, or adjust the thicknesses of the nanofiber-like non-polyolefin polymer porous layers oriented along the transverse stretching direction of the composite porous membranes, the diameters and lengths of the nanofibers. Preferably, the transverse stretching temperature is 120-150° C.; the transverse stretching ratio is 2-5 times; more preferably, the transverse stretching temperature is 130-140° C.; the transverse stretching ratio is 2.5-4.5 times.

According to the third aspect of the present invention, the composite porous membrane can be prepared by the following method of:

a) melting and extruding polypropylene, drawing at a high speed for oriented moulding to obtain a polypropylene precursor film;

b) annealing the polypropylene precursor film at a high temperature to obtain a polypropylene pre-stretched film;

c) stretching the polypropylene pre-stretched film by using a dry uniaxial stretching process to obtain an axial stretching film, coating a coating solution on one or two side surfaces of the axial stretching film, and then transversely stretching to obtain the composite porous membrane.

According to the present invention, step c) specifically comprises the following steps of:

c') multilayer laminating the polypropylene pre-stretched film, after pre-stretching 20-50% at 20-50° C., continuously stretching 30-80% at 100-130° C., and optionally peeling the multilayer laminated axial stretching film after stretching, to obtain an axial stretching film; after that, coating a coating solution on one or two side surfaces of the axial stretching film, and then transversely stretching to obtain the composite porous membrane.

In step c'), the multilayer lamination process is carried out by laminating at least one layer of the polypropylene pre-stretched film, and after stretching, an axial stretching film including at least one layer is obtained; more preferably, 8-16 layers of the polypropylene pre-stretched film are treated with multilayer lamination, and after stretching, an axial stretching film including 1-4 layers is obtained by interlaminar peeling.

In step a), the processes such as melt extrusion and high-speed drawing for oriented moulding etc. are all conventional methods known in the art, that is, after the polypropylene is melt-extruded, it is drawn at a high speed and moulded on a cooling roller to obtain a polypropylene precursor film. It can be understood by those skilled in the art that the temperature of the cooling roller is not particularly limited, at which the melt-extruded polypropylene can be cooled down and solidified on the surface of the cooling roller. Preferably, the temperature of the cooling roller is 60-120° C., and more preferably, the temperature of the cooling roller is 70-90° C.

In step a), the melt extrusion is preferably carried out in a screw extruder; those skilled in the art can understand that the screw extruder is not particularly limited, which can be a single-screw extruder or a twin-screw extruder, and is applicable to the system of the present invention. The moulding is preferably through a slit die; those skilled in the art can understand that the slit die is not particularly limited, which can be an adjustable slit die or an unadjustable slit die, and is applicable to the system of the present invention.

In step a), the melt extrusion temperature of the melt extruder is not particularly limited, which can be used in the polypropylene system of the present invention known to those skilled in the art, and at the temperature the melt extrusion can be carried out to obtain a polypropylene pre-stretched film. Preferably, the melt extrusion temperature of the screw extruder for extruding the polypropylene pre-stretched film is 200-260° C., and more preferably, the melt extrusion temperature of the screw extruder for extruding the polypropylene pre-stretched film is 220-250° C.

In step a), the purpose of the high-speed drawing for oriented moulding is to induce the molecular orientation structure of the polypropylene chains, and the speed of the high-speed drawing is not particularly limited. Preferably, the speed of the high-speed drawing is 20-80 m/min, and preferably, the speed of the high-speed drawing is 40-60 m/min.

In step b), the high temperature annealing refers to placing the polypropylene precursor film at a certain temperature for a certain time, so as to continue the crystallization of polypropylene which does not crystallize during the rapid cooling process, thereby increasing crystallinity and making the crystalline structure more perfect. Preferably, the temperature of the high temperature annealing is 100-140° C., and the annealing time is 8-10 h; more preferably, the temperature of the high temperature annealing is 120-130° C., and the annealing time is 4-5 h.

In step c) and step c'), in the dry uniaxial stretching process, the thicknesses of the polypropylene pre-stretched films which are actually stretched and the axial stretching films which are prepared after stretching are not particularly limited, which are applicable to the composite porous membrane systems of the present invention, and the function of the composite porous membranes can be realized, i.e., separating positive and negative electrodes and providing lithium ion transport channels. Since the multilayer lamination process is often employed in the dry uniaxial stretching process, the thicknesses of the axial stretching films obtained are different depending on the thicknesses of the polypropylene pre-stretched films by the multilayer lamination process; according to different preparation processes, the axial stretching films with various numbers of layers are obtained by selecting different thicknesses or peeling; preferably, the thicknesses of the polypropylene pre-stretched films are 16-60 μm, and more preferably, the thicknesses of the polypropylene pre-stretched films are 20-30 μm. Preferably, the thicknesses of the axial stretching films are 16-80 μm; more preferably, the thicknesses of the axial stretching films are 20-60 μm.

According to the third aspect of the invention, the composition and content of the coating solution are not particularly limited, but can be known to those skilled in the art that the nanofiber-like non-polyolefin polymer porous layers oriented along the transverse stretching direction of the composite porous membranes can be prepared on the surface of the composite porous membranes; preferably, the coating solution is a dispersion using water as a medium; the coating solution comprises water-insoluble polymer or water-insoluble polymer compositions; the water-insoluble polymer or the water-insoluble polymer compositions are dispersed in the system in the form of particles having an average diameter of 0.01-3 μm, more preferably 0.1-1 μm.

According to the third aspect of the invention, the dispersion using water as a medium can be polymer emulsions or polymer composition emulsions obtained by the emulsion polymerization of water-insoluble polymer or water-insoluble polymer compositions, or aqueous dispersion containing polymer or polymer composition obtained by grinding or pulverizing water-insoluble polymer or water-insoluble polymer compositions; those skilled in the art know that the selection and amount of the water-insoluble polymer or the water-insoluble polymer compositions in the dispersion using water as a medium are not specifically limited, which can be any one known to those skilled in the art to obtain a polymer-based dispersion using water as a medium, and then the nanofiber-like non-polyolefin polymer porous layers oriented along the transverse stretching direction of the composite porous membranes are prepared after being coated; preferably, the water-insoluble polymer or the water-insoluble polymer compositions are dispersed in the coating solution in the form of particles, which coated on at least one side surface of the axial stretching films to form polymer or polymer composition nanoparticles on the surface of the axial stretching films, and during the transversely stretching, the nanoparticles are stretched with the axial stretching films; the nanofiber-like porous layers oriented along the transverse stretching direction are produced. Preferably, the glass transition temperatures or melting points of the water-insoluble polymer or water-insoluble polymer compositions are lower than the transverse stretching temperature. Preferably, the water-insoluble polymer or polymer compositions comprise one or more of poly(vinylidene fluoride), poly(vinylidene chloride), poly(vinylidene fluoride-co-hexafluoropropylene) copolymer, polystyrene, poly(methyl methacrylate), poly(butylene succinate), polyurethane, perfluorosulfonic acid polymer (e.g., Nafion), etc. Preferably, the mass percent of the water-insoluble polymer or water-insoluble polymer compositions in the dispersion using water as a medium is 5-50%, more preferably 10-30%. Preferably, the mass percent of water in the dispersion using water as a medium is 50-95%, more preferably 70-90%.

According to the third aspect of the present invention, the coating solution also comprises organic fillers or inorganic fillers; the addition of the organic fillers or the inorganic fillers can be beneficial for further improving porosities and puncture resistance of the coating layers, that is, the nanofiber-like non-polyolefin polymer porous layers oriented along the transverse stretching direction of the composite porous membranes and improving the high-temperature resistant property of the composite porous membranes. The inorganic or the organic fillers can be selected from any that is applicable to the composite porous membrane systems known to those skilled in the art. Preferably, the inorganic fillers comprise one or more of silica, titanium dioxide, cerium oxide, zirconium dioxide, aluminum oxide, barium sulfate, calcium carbonate, carbon nitride, boehmite, silicon carbide, molecular sieve, talc, montmorillonite. Preferably, the organic fillers comprise one or more of high-temperature resistant polymer such as polytetrafluoroethylene, poly(ether ether ketone), polyethersulfone, poly(phenylene oxide), etc.

According to the third aspect of the invention, the sizes of the inorganic fillers are not particularly limited as long as the goal of uniform coatings on the porous base layers can be achieved. In the technical solution of the present invention, the inorganic particles can be either solid inorganic particles or porous inorganic particles. When they are porous inorganic particles, the preferred average pore diameters of the inorganic porous particles themselves are usually 0.0001-0.5 µm.

According to the third aspect of the invention, the added amount of the organic or the inorganic fillers in the coating solution is not particularly limited, and according to the applications of the prepared composite porous membranes in different areas, the added amount of the organic or the inorganic fillers is different. Preferably, the added amount of the organic fillers is 5-10 wt % of the coating solution; and the added amount of the inorganic fillers is 5-20 wt % of the coating solution.

According to the third aspect of the invention, the coating solution also comprises a binder; the addition of the binder can be advantageous for further improving the bonding performance between the coating layers, that is, the nanofiber-like non-polyolefin polymer porous layers oriented along the transverse stretching direction of the composite porous membranes and the porous base layers, and prolonging the service life. The binder is selected from any that is applicable to the composite porous membrane systems known to those skilled in the art. Preferably, the binder comprises a polyacrylate emulsion, a polyurethane emulsion, a poly(butadiene-styrene) emulsion, poly(vinyl alcohol), carboxymethyl cellulose, etc. The added amount of the binder is 2-8 wt % of the coating solution; preferably 3-6 wt %.

A fourth aspect of the present invention provides uses of the above composite porous membrane, which can be used in the fields such as preparing lithium ion battery separators, gas separation membranes, etc.

A fifth aspect of the invention provides a lithium ion battery separator, which comprises the above composite porous membrane.

A sixth aspect of the invention provides a gas separation membrane, which comprises the above composite porous membrane.

According to the present invention, the main component of the coating solution for preparing the coating layer is a material with different diffusion coefficients for gases.

Preferably, the material with different diffusion coefficients for gases comprises polymer such as silicone rubber, polyimide, polysulfone, poly(phenylene oxide), cellulose acetate, etc.

According to the present invention, the gas separation membrane can be used to prepare a gas separation membrane with a gas separation functional layer.

A seventh aspect of the present invention provides a facility to produce the above composite porous membranes, which comprises a feeding and extrusion system, a casting system, an axial stretching system, a second coating system, and a transverse stretching system;

the feeding and extrusion system is connected to the axial stretching system via the casting system, and the axial stretching system is connected to the transverse stretching system via the second coating system.

According to the invention, the feeding and extrusion system comprises a feeding equipment, a screw extruder, a first melt pipe, a filter and a second melt pipe.

Preferably, the second melt pipe is connected with the casting system.

Preferably, the feeding equipment is located above the feeding port of the screw extruder; the screw extruder is connected to the filter via the first melt pipe; the filter is connected to the casting system via the second melt pipe;

preferably, a metering pump is also arranged in the first melt pipe.

According to the invention, the film casting system comprises a slit die and a casting roller.

Preferably, the slit die is selected from an automatically thickness-adjusted die, and the casting roller is selected from an accurately temperature-controlled casting roller.

According to the present invention, the facility also comprises a first coating system.

According to the present invention, the first coating system is arranged between the film casting system and the axial stretching system.

According to the present invention, the first coating system comprises a first coating part.

According to the present invention, the second coating system comprises a second coating part.

According to the present invention, the axial stretching system comprises preheating through precise temperature control, stretching and a set of heat setting rollers.

According to the present invention, the transverse stretching system comprises a rail, a chain, an oven and a driving mechanism.

According to the present invention, the facility also comprises a traction winding system, the purpose of which is to pass the prepared composite porous membrane through the traction winding system to obtain a roll of the composite porous membrane.

According to the present invention, the facility also comprises a thickness feedback control system. The thickness feedback control system comprises a thickness gauge and a control system; the thickness gauge online measures film thicknesses and controls the automatically adjusted slit die by using the control system to realize the automatic control of the thickness of the porous membrane.

According to the present invention, the thickness feedback control system comprises a first thickness feedback control system and a second thickness feedback control system.

According to the present invention, the first thickness feedback control system is arranged between the film casting system and the axial stretching system. Preferably, the first thickness feedback control system is arranged between the first coating system and the axial stretching system.

According to the present invention, the second thickness feedback control system is arranged after the transverse stretching system. Preferably, the second thickness feedback control system is arranged between the transverse stretching system and the traction winding system.

According to the present invention, the first thickness feedback control system comprises a film thickness gauge, the purpose of which is to measure and control the thickness of a non-stretching film or to measure and control the thickness of a non-stretching film coated on at least one side with a coating solution.

According to the present invention, the second thickness feedback control system comprises a film thickness gauge, the purpose of which is to measure and control the thickness of a stretching film.

According to the present invention, the facility also comprises an automatic control system; according to the present invention, the automatic control system comprises a pressure and temperature control module, a PLC, a frequency converter and a sensor for controlling temperature, pressure, tension and speed etc. of the facility.

An eighth aspect of the present invention provides a method for producing the composite porous membrane, which is prepared by using the above facility, and the method comprises the following steps of:

(a) melting polypropylene containing a nucleating agent, which is capable of promoting the formation of β-crystalline form, via the feeding equipment into the screw extruder, the melt flows through the first melt pipe and the metering pump, and after accurately measured and filtered through the filter, enters the second melt pipe;

(b) casting the melt of step (a) through the slit die onto the casting roller to crystallize and form a film with high content of β-crystal;

(c) peeling the film with high content of β-crystal of step (b) from the casting roller; optionally, coating a coating solution on one or two side surfaces of the film through the first coating system;

optionally, monitoring the film with high content of β-crystal by using the film thickness gauge, and measuring the thickness of the non-stretching film or the thickness of the non-stretching film coated on at least one side with a coating solution;

(d) axially stretching the non-stretching film or the non-stretching film coated on one or two side surfaces with a coating solution of step (c) through the axial stretching system to obtain an axial stretching film;

(e) coating a coating solution on one or two side surfaces of the axial stretching film of step (d) through the second coating system;

(f) passing the film of step (e) through the transverse stretching system to obtain a transverse stretching film, and thus obtain the composite porous membrane.

According to the present invention, the method for producing the composite porous membrane also comprises the following steps of:

(g) passing the composite porous membrane of step (f) through the traction winding system to obtain a roll of the composite porous membrane;

optionally, before passing through the traction winding system, monitoring the thickness of the composite porous membrane by using the film thickness gauge.

According to the present invention, the coating with a coating solution can be carried out by any method known in the art, such as spraying, knife coating, gravure coating, etc.

Advantageous Effects

1. The present invention provides a composite porous membrane and a preparation method therefor and a use thereof, the composite porous membrane comprises at least one porous base layer and at least one uniaxially stretching coating layer located on at least one side surface of the porous base layer; specifically, the composite porous membrane comprises at least one porous base layer and at least one nanofiber-like non-polyolefin polymer porous layer oriented along the transverse stretching direction of the composite porous membrane and located on one or two side surfaces of the porous base layer, or the composite porous membrane comprises a biaxially stretching polypropylene porous base layer and a uniaxially stretching coating layer located on at least one side surface of the porous base layer. According to the preparation method, the composite porous membrane is prepared by introducing a coating solution prior to transversely stretching, and the nanofiber-like non-polyolefin polymer porous layer oriented along the transverse stretching direction of the composite porous membrane may inhibit the cracking in the machine direction during using the composite porous membrane, and thus improve the using performance of the composite porous membrane.

2. The present invention also provides a facility for preparing a composite porous membrane, including a feeding and extrusion system, a film casting system, an axial stretching system, a second coating system, a transverse stretching system; a composite porous membrane with better performance parameters is obtained by using the facility, and the method has the advantages of simple process, convenient preparation, and is applicable to industrialized production.

3. The present invention also provides a separator for lithium batteries and a gas separation membrane. The separator for lithium batteries comprises the above composite porous membrane; the gas separation membrane comprises the above composite porous membrane; when the composite porous membrane is used as a separator for lithium batteries, the coating layer can form a gel in the electrolyte to improve the wettability of the separator towards the electrolyte or improve heat resistance of the porous base layer. When the composite porous membrane is used for gas separation, the permeability coefficients of the coating layer are different for different gases, which can achieve gas separation and enrichment.

BRIEF DESCRIPTION OF THE FIGURES

the markings in the drawing are described as follows, 1 is a feeding equipment; 2 is a screw extruder; 3 is a metering pump; 4 is a filter; 5 is a second melt pipe; 6 is a slit die; 7 is a film casting roller; 8 is a first coating part; 9 is a film thickness gauge; 10 is an axial stretching system; 11 is a second coating part; 12 is a transverse stretching system; 13 is a film thickness gauge; 14 is a traction winding system; 15 is an automatic control system.

EXAMPLES

In order to make the objects, technical schemes and advantages of the present invention clearer, the present invention is further described in detail hereinafter with reference to the specific embodiments and accompanying drawings. However, it is understood by those skilled in the art that the present invention is not limited to the drawings and the following embodiments.

Example 1

A polypropylene homopolymer resin having a melt flow index of 2.5 g/10 min and a β-crystal nucleating agent of N,N-dicyclohexyl-2,6-naphthalenediamide which was 0.03 wt % of the polypropylene homopolymer resin were uniformly mixed. After melting at a temperature of 200-250° C., a polypropylene layer melt was formed; After the polypropylene layer melt was extruded through a T-slit die, it was cooled and crystallized on a 128° C. casting roller to obtain a polypropylene film containing β crystal, i.e., a film with high content of β-crystal. After the film was stretched 4.5 times in the machine direction at 100° C., two side surfaces of the film were coated with an aqueous dispersion with a solid content of 20% and poly(vinylidene fluoride) with a particle size of 200 nm to form a coating layer having a thickness of 6 μm, respectively, and then the film entered into the transverse stretching system and was transversely stretched 3.0 times at 135° C. to obtain a 20 μm thick composite polypropylene porous membrane. Among them, the thicknesses of the two poly(vinylidene fluoride) layers were 2 respectively, and the thickness of the core polypropylene porous base layer was 16 The diameters of the polyvinylidene fluoride fibers in the two surfacial poly(vinylidene fluoride) layers were 30-70 nm.

Figure 1:
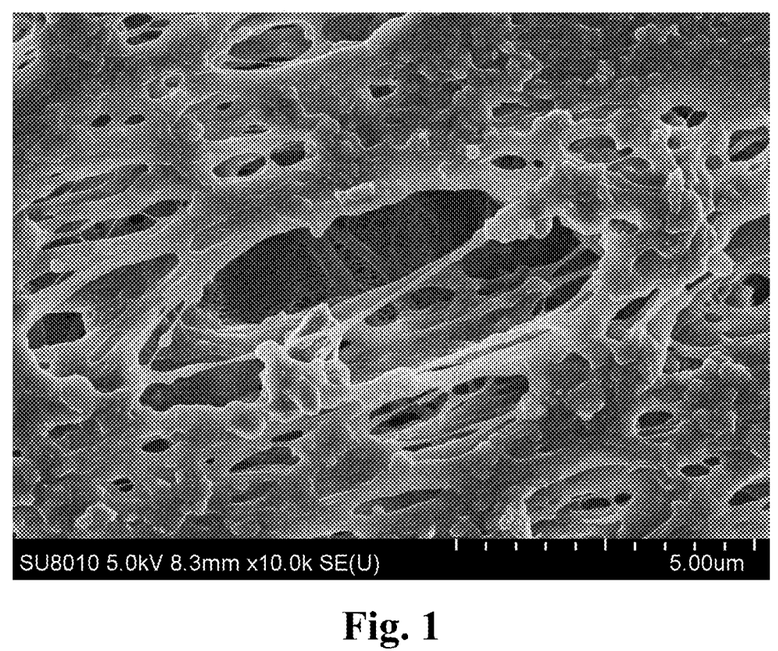
FIG. 1 is a scanning electron micrograph of the composite porous membrane of Example 1 of the present invention.

FIG. 1 is a scanning electron microscope image of the composite porous membrane of Example 1 of the present invention.

Example 2

A polypropylene homopolymer resin having a melt flow index of 2.5 g/10 min was melted at 200-250° C. through a single screw extruder, extruded through a T-slit die, and wound up at a speed of 50 m/min to obtain a highly oriented polypropylene film. After the polypropylene film was annealed and crystallized at 125° C., a polypropylene pre-stretched film was obtained. After the polypropylene pre-stretched film was pre-stretched by 40% at 30° C., an axial stretching film having a porosity of 30% was obtained by continuously stretching by 50% at 125° C. Two side surfaces of the film were coated with an aqueous dispersion with a solid content of 20% and poly(vinylidene fluoride) with a particle size of 200 nm to form a coating layer having a thickness of 6 respectively, and then the film entered into the transverse stretching system and was transversely stretched 4.0 times at 140° C. to obtain a 20 μm thick composite polypropylene porous membrane. Among them, the thicknesses of the two poly(vinylidene fluoride) layers were 2 respectively, and the thickness of the core polypropylene porous base layer was 12 The diameters of the poly(vinylidene fluoride) nanofibers in the two surfacial poly(vinylidene fluoride) layers were 30-50 nm.

Example 3

In Example 3, except that the aqueous dispersion with a solid content of 15% and poly(methyl methacrylate) with a particle size of 500 nm, the rest was the same as in Example 1 to obtain that the thicknesses of the two poly(methyl methacrylate) layers were 2 respectively, and the thickness of the core polypropylene porous base layer was 16 The diameters of the poly(methyl methacrylate) nanofibers in the two skin layers were 80-120 nm.

Comparative Example 1

A polypropylene homopolymer resin having a melt flow index of 2.5 g/10 min and the polypropylene with a β-nucleating agent of N,N-dicyclohexyl-2,6-naphthalenediamide which was 0.03 wt % of the polypropylene homopolymer resin were uniformly mixed. After melting at a temperature of 200-250° C., a polypropylene layer melt was formed;

After the polypropylene layer melt was extruded through a T-slit die, it was cooled and crystallized on a 128° C. casting roller to obtain a polypropylene film containing β crystal, i.e., a film with high content of β-crystal. After the film was stretched 4.5 times in the machine direction at 100° C., it entered into the transverse stretching system and was transversely stretched 3.0 times at 135° C. to obtain a 16 μm thick composite polypropylene base film. Two side surfaces of the polypropylene base film were coated with an aqueous dispersion with a solid content of 20% and poly(vinylidene fluoride) with a particle size of 200 nm to form a coating layer having a thickness of 2 μm, respectively, and dried to obtain a 20 μm thick composite polypropylene porous membrane.

Figure 2:
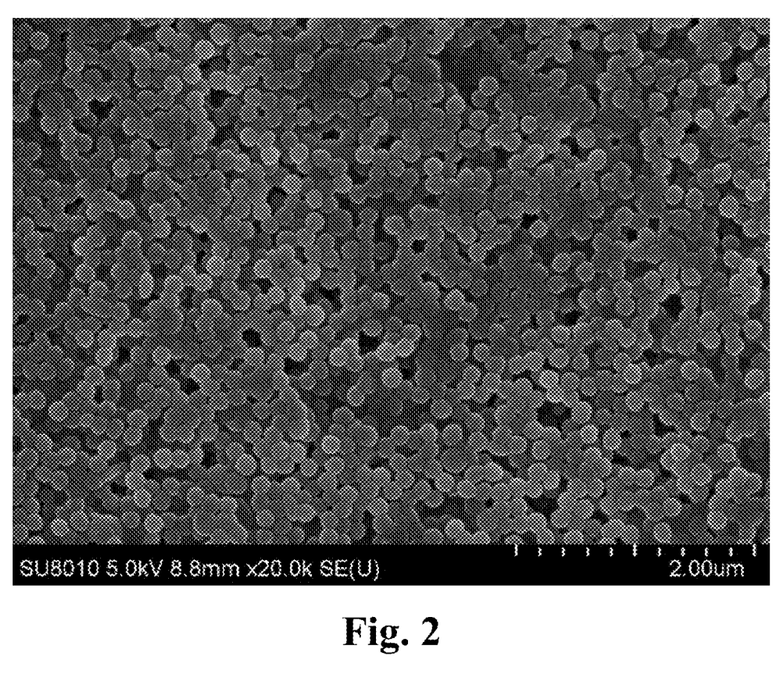
FIG. 2 is a scanning electron micrograph of the composite porous membrane of Comparative Example 1 of the present invention.

FIG. 2 is a scanning electron microscope image of the composite porous membrane of Comparative Example 1 of the present invention.

As shown in FIG. 1, by using the method of the present invention, after the poly(vinylidene fluoride) coating layer, spherical particles of 200 nm size aggregation obtained by coated on the surface of the axial stretching polypropylene film, was stretched accompanying with the transversely stretching of the substrate, the spherical poly(vinylidene fluoride) particles were deformed to nanofibers oriented along the transverse stretching direction, the nanofibers having a diameter of about 10-70 nm. As shown in FIG. 2, without using method of the present invention, the coating was not transversely stretched, poly(vinylidene fluoride) coating layer with spherical particles aggregation obtained.

Example 4

Figure 3:
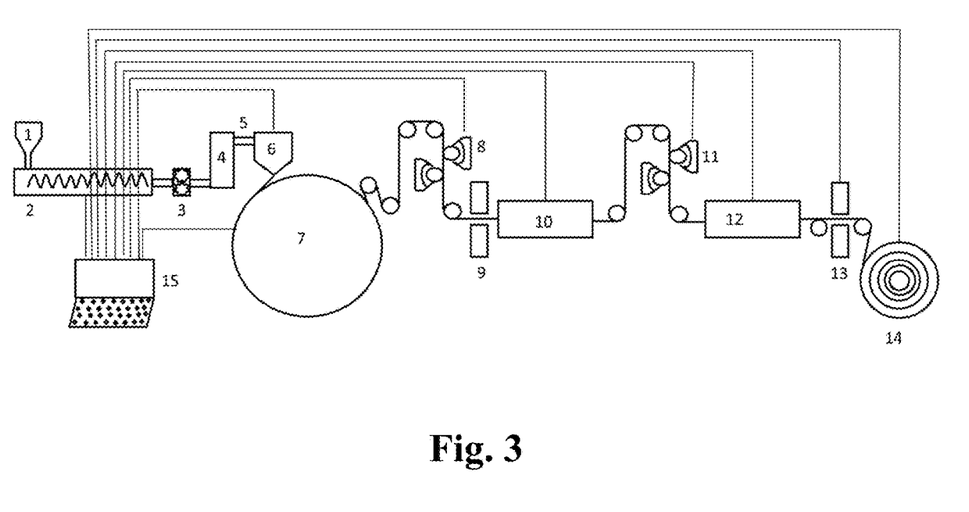
FIG. 3 is a view of the facility for preparing the composite porous membrane of the present invention.

A polypropylene homopolymer resin having a melt flow index of 2.5 g/10 min and a β-crystal nucleating agent of N,N-dicyclohexyl-2,6-naphthalenediamide which was 0.03 wt % of the polypropylene homopolymer resin were uniformly mixed, and added into the single screw extruder 2 via the feeding equipment 1. After being melt at 160-230° C., it was measured with the metering pump 3, passed through the filter 4, and entered the T-slit die 6 through the second melt pipe 5 and extruded. It was cooled down on the casting roller 7 to obtain a polypropylene film with a β-crystal nucleating agent. The thickness of the polypropylene film with the β-crystal nucleating agent was 140 μm.

The film entered into the axial stretching system 10 via the film thickness gauge 9, and was stretched 4.5 times at 100° C. in the machine direction to obtain an axial stretching film.

Two side surfaces of the axial stretching film were coated with an aqueous dispersion of poly(methyl methacrylate) with a solid content of 25 wt % through the second coating system, and the thickness of the coating after drying was 6 μm. The coated axial stretching film was transversely stretched 3.0 times at 135° C. in a transverse stretching system to obtain a composite polypropylene porous membrane, which was coated on two side surfaces with poly(methyl methacrylate) and exhibited porous structure on the sides.

The thickness of the coating layer was 2 μm; the thickness of the composite porous membrane was 20 μm.

When the composite polypropylene porous membrane prepared as described above was used as lithium ion battery separators, the wettability and the absorbency of the separators towards lithium ion battery electrolytes were obviously improved compared to those of single-layer polypropylene separators.

Example 5

Example 5 was the same as Example 4 except that the axial stretching film was coated on one side with a Nafion solution (purchased from DuPont Company) through the coating system (II), the thickness of the coating after drying was 3 μm, and then it was transversely stretched to obtain a composite polypropylene porous membrane, which was coated on one side with Nafion and exhibited non-porous dense structure on the side.

The thickness of the coating layer was 1.0 μm; the thickness of the composite polypropylene porous membrane was 19 μm.

When the composite polypropylene porous membrane prepared as described above was used as lithium ion battery separators, due to the non-porous dense structure of the Nafion layer on the surface, polysulfide dissolved in electrolytes could not be transported through the separators, but lithium ions could be bound to sulfonic acid groups of Nafion to be transported. Therefore, the composite polypropylene porous membrane could alleviate polysulfide "shuttling effect" in lithium-sulfur batteries and improve the cycling performance of lithium-sulfur batteries.

Example 6

Example 6 was the same as Example 4 except that the axial stretching film was coated on one side with a solution of polydimethylsiloxane in xylene through the second coating system, the thickness of the coating after drying was 6 μm, and then it was transversely stretched to obtain a composite polypropylene porous membrane, which was coated on one side with polydimethylsiloxane and exhibited non-porous dense structure on the side.

The thickness of the coating layer was 2 μm; the thickness of the composite polypropylene porous membrane was 20 μm.

When the composite polypropylene porous membrane prepared as described above was used as a gas separation membrane, the separation of ethanol/water solution by pervaporation achieved good effect.

Example 7

A facility was used to produce the composite polypropylene porous membranes in Examples 4-6, which comprised a feeding and extrusion system, a film casting system, an axial stretching system, a second coating system, and a transverse stretching system;

the feeding and extrusion system was connected to the axial stretching system via the casting system, and the axial stretching system was connected to the transverse stretching system via the second coating system.

In a preferred embodiment of the present invention, the feeding and extrusion system comprises a feeding equipment 1, a screw extruder 2, a first melt pipe, a filter 4 and a second melt pipe 5;

the second melt pipe 5 is connected with the film casting system; the feeding equipment 1 is located above the feeding port of the screw extruder 2; the screw extruder 2 is connected to the filter 4 via the first melt pipe; the filter 4 is connected to the film casting system via the second melt pipe 5; the metering pump 3 is also arranged in the first melt pipe.

In a preferred embodiment of the present invention, the film casting system includes a slit die 6 and a casting roller 7; the slit die 6 is selected from an automatically thickness-adjusted slit die; the casting roller 7 is selected from an accurately temperature-controlled casting roller.

In a preferred embodiment of the present invention, the facility also comprises a first coating system; the first coating system is arranged between the film casting system and the axial stretching system; the first coating system comprises a coating part 8; the second coating system comprises a second coating part 11.

In a preferred embodiment of the present invention, the axial stretching system 10 comprises preheating through precise temperature control, stretching and a set of heat setting rollers; the transverse stretching system 12 comprises a rail, a chain, an oven and a driving mechanism.

In a preferred embodiment of the present invention, the facility also comprises a traction winding system 14.

In a preferred embodiment of the present invention, the facility also comprises a thickness feedback control system; the thickness feedback control system comprises a thickness gauge and a control system; the thickness gauge online measures film thicknesses and controls the automatically adjusted the slit die by using the control system to realize the automatic control of the thickness of the polypropylene porous membrane.

In a preferred embodiment of the present invention, the thickness feedback control system comprises a first thickness feedback control system and a second thickness feedback control system; the first thickness feedback control system is arranged between the film casting system and the axial stretching system; the first thickness feedback control system is arranged between the first coating system and the axial stretching system; the second thickness feedback control system is arranged after the transverse stretching system; the second thickness feedback control system is arranged between the transverse stretching system and the traction winding system 14.

The first thickness feedback control system comprises a film thickness gauge 9; the second thickness feedback control system comprises a film thickness gauge 13, the purpose of which is to measure and control the thickness of a stretching film.

In a preferred embodiment of the present invention, the facility also comprises an automatic control system 15; the automatic control system 15 comprises a pressure and temperature control module, a PLC, a frequency converter and a sensor.

The embodiments of the present invention are described above. However, the present invention is not limited to the above embodiments. Any modification, equivalent alternative, improvement, etc., falling within the spirit and scope of the present invention, are intended to be comprised within the scope of the present invention.

The invention claimed is:

1. A composite porous membrane comprising:
   a porous base layer that is biaxially stretched in a first direction and a second direction, wherein the second direction is transverse to the first direction; and
   at least one non-polyolefin polymer porous layer attached to one surface of the porous base layer, wherein the at least one non-polyolefin polymer porous layer is uniaxially stretched in the second direction,
   nanofibers and the at least one non-polyolefin polymer porous layer contains ligaments having diameters that are in the range of 10-500 nm.

2. The composite porous membrane of claim 1, wherein said porous base layer is a porous polyethylene base layer, a porous polypropylene base layer, or a porous polypropylene/polyethylene/polypropylene tri-layer composite base layer.

3. A method for producing the composite porous membrane of claim 1, comprising:
   axially stretching a film in a first direction to obtain an axially stretched film;
   applying a coating solution on one or two side surfaces of the axially stretched film; and,
   transversely stretching the coated axially stretched film in the second direction to obtain said composite porous membrane,
   wherein said coating solution is an aqueous dispersion that contains a water-insoluble polymer composition or a water-insoluble polymer composition in form of particles having an average diameter of 0.01-3 μm.

4. A separator for lithium batteries, comprising the composite porous membrane of claim 1.

5. A gas separation membrane, comprising the composite porous membrane of claim 1.

6. The method of claim 3, wherein the axially stretched film has a porosity of 5-35%, a thickness of 16-80 μm, or both.

7. The method of claim 3, wherein the film is a polypropylene film, further comprising:
   adding a nucleating agent into polypropylene to form β-crystalline form of polypropylene;
   subjecting the polypropylene to melting, extruding, moulding to obtain the film having a high content of β-crystal, and
   wherein the axially stretching step is carried out at a temperature of 60-120° C. and reaches an axial stretching ratio of 2.5-5.5 times,
   wherein a thickness of a coating layer of the coated axially stretched film is 0.3-10 μm, and
   wherein the transversely stretching step is carried out at a temperature of 120-150° C. and reaches
   a transverse stretching ratio of 2-5 times.

8. The method of claim 3, wherein the film is a pre-stretched polypropylene film obtained by
   a) subjecting polypropylene to melting, extruding, and drawing at a high speed for oriented moulding to obtain a polypropylene precursor film;
   b) annealing the polypropylene precursor film to obtain the polypropylene pre-stretched film.

9. The method of claim 8, further comprising:
   c) laminating a plurality of the pre-stretched polypropylene films to obtain a multilayer laminated film, pre-stretching the multilayer film 20-50% at 20-50° C., continuously stretching 30-80% at 100-130° C., and optionally peeling the stretched multilayer laminated film to obtain the film.

10. The method of claim 9, wherein, in step c), wherein said multilayer laminated film contains 8-16 layers of the polypropylene pre-stretched film.

11. The method for producing the composite porous membrane of claim 8, wherein said coating solution is a polymer or polymer composition emulsion obtained by the emulsion polymerization of water-insoluble polymer or water-insoluble polymer compositions, or an aqueous polymer or polymer composition dispersion obtained by grinding or pulverizing water-insoluble polymer or water-insoluble polymer compositions.

12. The method for producing the composite porous membrane of claim 8, wherein a glass transition temperatures or a melting point of said water-insoluble polymer composition or said water-insoluble polymer composition are lower than the transverse stretching temperature.

* * * * *